(12) United States Patent
Lin et al.

(10) Patent No.: US 7,548,416 B2
(45) Date of Patent: Jun. 16, 2009

(54) COMPUTER HOUSING

(75) Inventors: Wen-Hao Lin, Taipei (TW); Wei-Jen Lee, Taipei (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 230 days.

(21) Appl. No.: 11/480,946

(22) Filed: Jul. 6, 2006

(65) Prior Publication Data

US 2008/0007907 A1    Jan. 10, 2008

(51) Int. Cl.
*H05K 5/00* (2006.01)
*H05K 7/00* (2006.01)
*G06F 1/16* (2006.01)

(52) U.S. Cl. .............................. 361/679.33; 361/679.02; 361/679.6; 361/683; 361/685

(58) Field of Classification Search ................. 361/679, 361/683, 685, 695, 679.02, 679.6
See application file for complete search history.

(56) References Cited

U.S. PATENT DOCUMENTS

| | | | | |
|---|---|---|---|---|
| 5,661,797 | A | * | 8/1997 | Leman et al. .......... 379/433.13 |
| 5,815,379 | A | * | 9/1998 | Mundt ........................ 361/683 |
| 6,097,591 | A | * | 8/2000 | Ircha ........................... 361/683 |
| 6,119,019 | A | * | 9/2000 | Phelps ..................... 455/575.3 |
| 6,229,696 | B1 | * | 5/2001 | Lin et al. .................... 361/683 |
| 6,330,161 | B1 | * | 12/2001 | Smith et al. ................ 361/724 |
| 6,349,029 | B1 | | 2/2002 | Leman et al. |
| 6,392,875 | B1 | | 5/2002 | Erickson et al. |
| 6,404,625 | B1 | | 6/2002 | Chen et al. |
| 6,530,628 | B1 | | 3/2003 | Huang et al. |

* cited by examiner

*Primary Examiner*—Anatoly Vortman
*Assistant Examiner*—Quinn Hunter
(74) *Attorney, Agent, or Firm*—Rosenberg, Klein & Lee (57) ABSTRACT

A computer housing includes a shell having a side opening, a first side wall and a second side wall, and a support bracket rotatably mounted on the shell and having a head portion, a tail portion, and a support portion. Thus, when the support bracket is rotatable to a closed position, the tail portion of the support bracket is rested on the second side wall of the shell, and the support portion of the support bracket is received in an inside of the shell, and when the support bracket is rotatable to an open position, the tail portion of the support bracket is detached from the second side wall of the shell, and the support portion of the support bracket is detached from the inside of the shell.

7 Claims, 7 Drawing Sheets

COMPUTER HOUSING

BACKGROUND OF THE INVENTION

1. Field of the Invention

The present invention relates to a housing, and more particularly to a computer housing for the main frame of a computer.

2. Description of the Related Art

A conventional computer housing comprises a shell, a rotatable top cover rotatably mounted in the shell, and a screw board fixed on the top cover for mounting a peripheral device (hard disk, floppy disk, optical disk, CD burner and the like). However, the inner space of the shell is not used efficiently. In addition, the top cover cannot be detached, so that the top cover is easily returned to the original state due to unintentional touch or hit, thereby causing danger to the user when repairing the computer housing.

Another conventional computer housing comprises a shell, a seat mounted in the shell, and a rotation case rotatably mounted on the seat for mounting a peripheral device (hard disk, floppy disk, optical disk, CD burner and the like). However, the inner space of the shell is not used efficiently. In addition, the rotation case cannot be detached and well supported, so that the rotation case is easily returned to the original state due to unintentional touch or hit, thereby causing danger to the user when repairing the computer housing.

The closest prior art of which the applicant is aware is disclosed in the U.S. Pat. No. 6,330,161, and the Taiwanese Patent Publication No. 211361, 588922 and 219709.

SUMMARY OF THE INVENTION

The present invention is to mitigate and/or obviate the disadvantage of the conventional computer housing.

The primary objective of the present invention is to provide a computer housing, wherein the peripheral device is suspended in or detached from the inside of the shell by the support bracket to save the inner space of the shell, so that the inner space of the shell is employed efficiently to mount more peripheral devices.

Another objective of the present invention is to provide a computer housing, wherein when the support bracket is rotatable to the open position, the support bracket is entirely detached from the side opening of the shell, and the peripheral device is entirely detached from the inside of the shell, so that the inner space of the shell is entirely exposed outwardly, thereby facilitating assembly, disassembly and maintenance of the parts contained in the inner space of the shell.

A further objective of the present invention is to provide a computer housing, wherein the support bracket is mounted onto and detached from the connecting seat easily, quickly and conveniently without needing aid of additional tools, thereby facilitating the user assembling and disassembling the support bracket.

A further objective of the present invention is to provide a computer housing, wherein the support bracket is positioned by the catch member so that the support bracket will not fall down due to hit to prevent the user from being hurt and to prevent the peripheral device from being damaged.

In accordance with the present invention, there is provided a computer housing, comprising:

a shell having a side opening, a first side wall and a second side wall, wherein the first side wall and the second side wall of the shell are located at two opposite sides of the side opening;

a support bracket rotatably mounted on the shell and having a head portion rotatably mounted on the first side wall of the shell, a tail portion extending to the second side wall of the shell, and a support portion located between the head portion and the tail portion for mounting a peripheral device;

wherein, when the support bracket is rotatable to a closed position, the tail portion of the support bracket is rested on the second side wall of the shell, and the support portion of the support bracket is received in an inside of the shell;

wherein, when the support bracket is rotatable to an open position, the tail portion of the support bracket is detached from the second side wall of the shell, and the support portion of the support bracket is detached from the inside of the shell.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a computer housing in accordance with the preferred embodiment of the present invention comprises a shell 1, and a support bracket 2 rotatably mounted on the shell 1.

The shell 1 has a side opening 10, a first side wall 11 and a second side wall 12. The first side wall 11 and the second side wall 12 of the shell 1 are located at two opposite sides of the side opening 10.

The support bracket 2 has a head portion 20 rotatably mounted on the first side wall 11 of the shell 1, a tail portion 21 extending to the second side wall 12 of the shell 1, and a support portion 22 located between the head portion 20 and the tail portion 21 for mounting a peripheral device 3 (hard disk, floppy disk, optical disk, CD burner and the like). Preferably, the peripheral device 3 is a hard disk.

Figure 2:
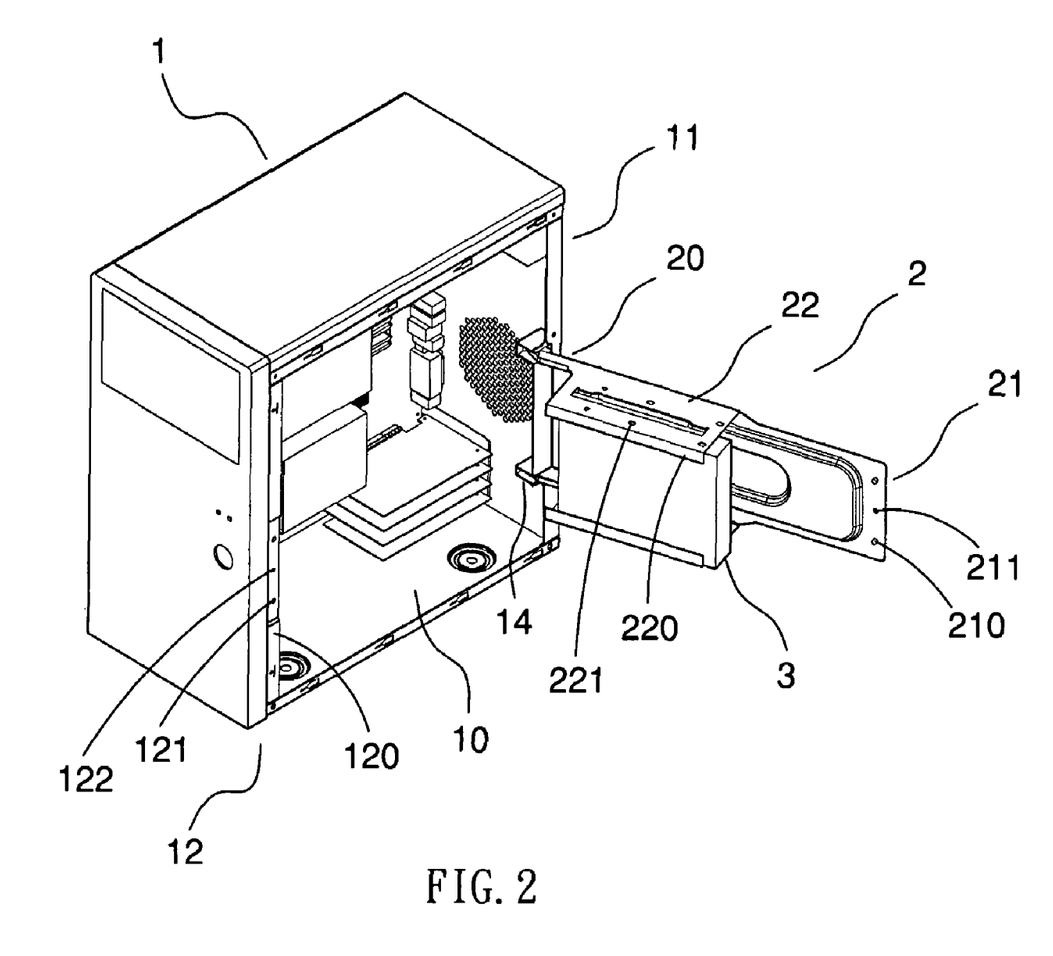
FIG. 2 is a schematic operational view of the computer housing as shown in FIG. 1 in use.

When the support bracket 2 is rotatable to an open position as shown in FIG. 2, the tail portion 21 of the support bracket 2 is detached from the second side wall 12 of the shell 1, and the support portion 22 of the support bracket 2 is detached from the inside of the shell 1.

Figure 1:
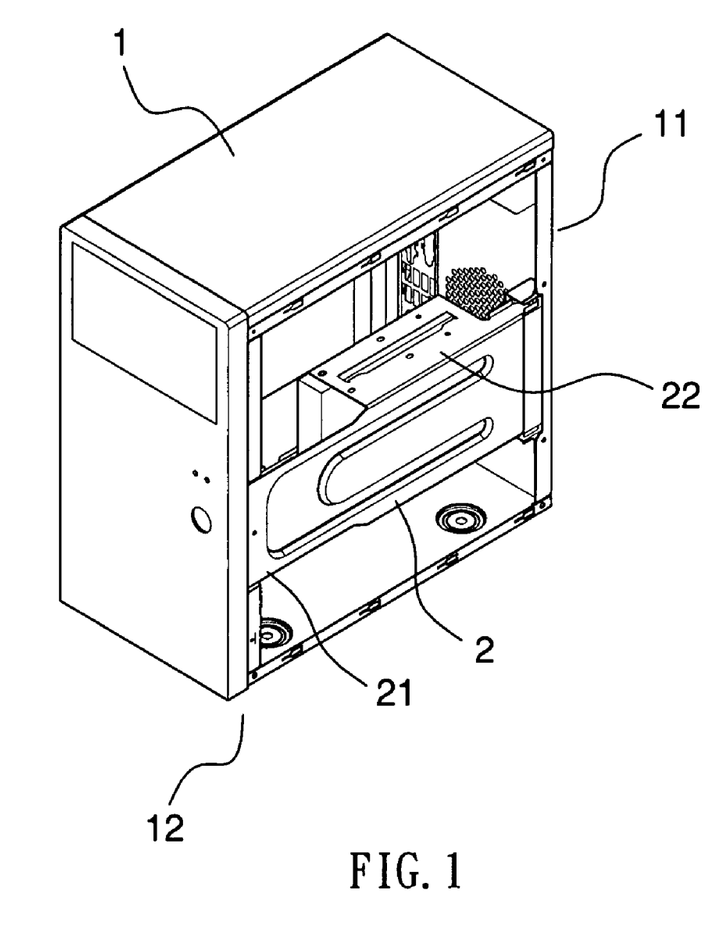
FIG. 1 is a perspective view of a computer housing in accordance with the preferred embodiment of the present invention.

On the contrary, when the support bracket 2 is rotatable to a closed position as shown in FIG. 1, the tail portion 21 of the support bracket 2 is rested on the second side wall 12 of the shell 1, and the support portion 22 of the support bracket 2 is received in the inside of the shell 1.

Thus, when the support bracket 2 is rotatable to the open position as shown in FIG. 2, the support bracket 2 is entirely detached from the side opening 10 of the shell 1, and the peripheral device 3 received in the support portion 22 of the support bracket 2 is entirely detached from the inside of the shell 1, so that the inner space of the shell 1 is entirely exposed outwardly, thereby facilitating assembly and maintenance of the parts contained in the inner space of the shell 1.

In the preferred embodiment of the present invention, the first side wall 11 of the shell 1 includes a first piece 13 having an inner face 130 facing the inside of the shell 1, and a connecting seat 14 detachably mounted on the inner face 130 of the first piece 13, wherein the head portion 20 of the support bracket 2 is rotatably connected to the connecting seat 14 of the shell 1.

Thus, by provision of the connecting seat 14 of the shell 1, the support bracket 2 is selectively mounted on the shell 1 according to the user's requirement.

The computer housing further comprises a side plate 15 to cover the side opening 10 of the shell 1 and the support bracket 2.

Figure 3:
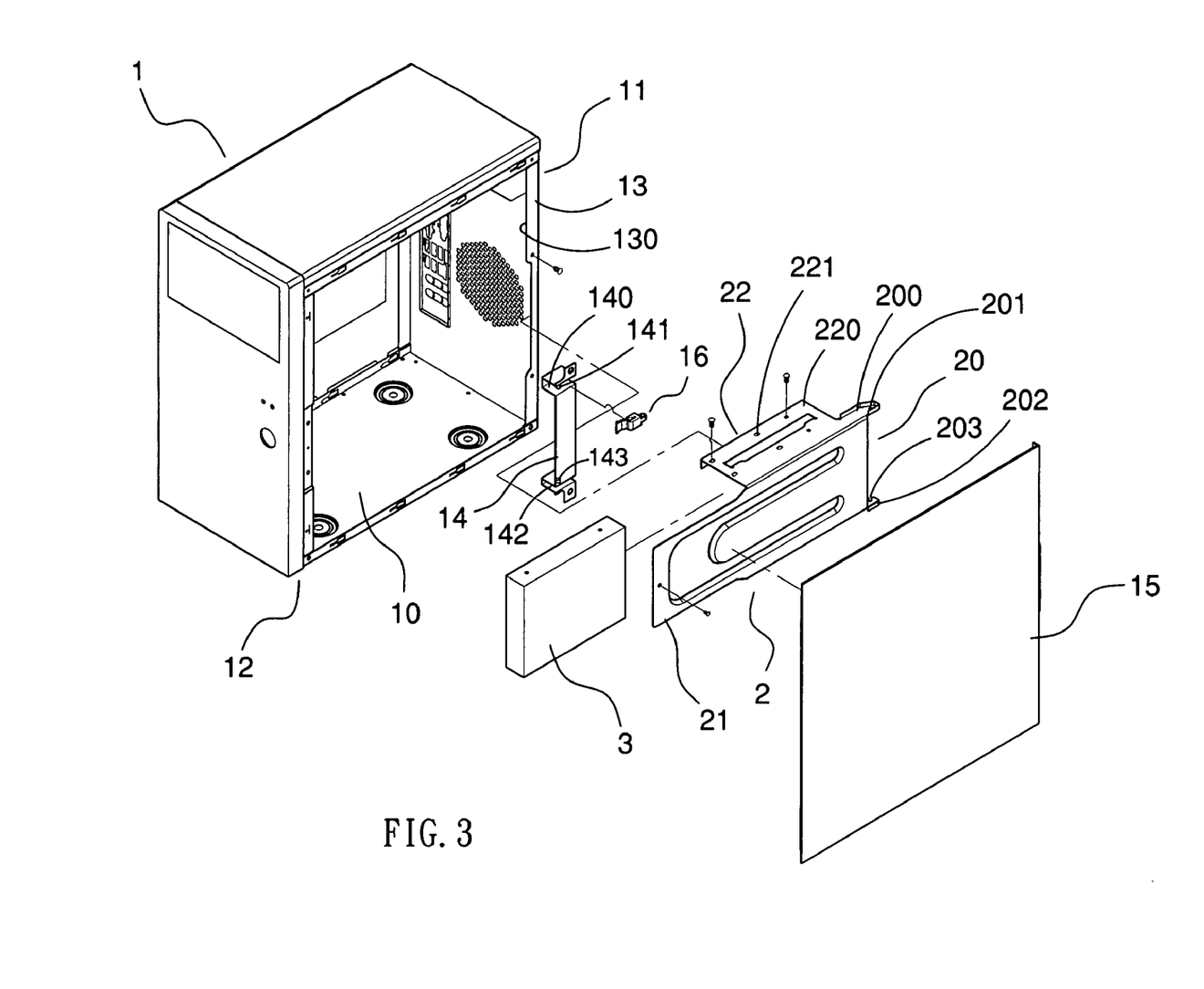
FIG. 3 is an exploded perspective view of the computer housing as shown in FIG. 1.
Figure 4:
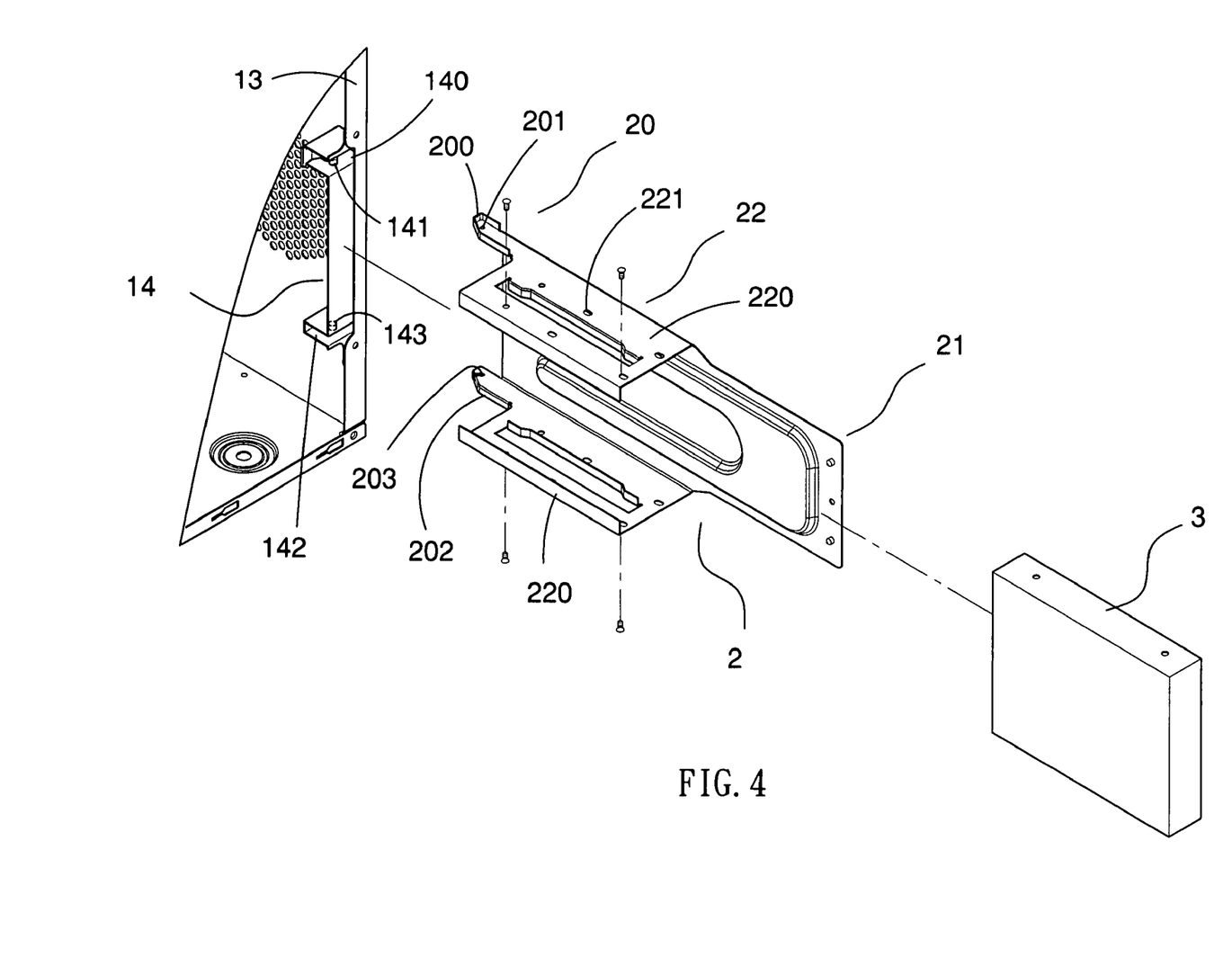
FIG. 4 is a partially exploded perspective view of the computer housing as shown in FIG. 1.

The head portion 20 of the support bracket 2 includes a first protruding ear 200 having a first shaft hole 201 and a second protruding ear 202 spaced from the first protruding ear 200 and having a second shaft hole 203 co-axial with the first shaft hole 201. The connecting seat 14 of the shell 1 has a first recess 140 to receive the first protruding ear 200, a first protruding shaft 141 located in the first recess 140 and inserted into the first shaft hole 201 of the first protruding ear 200, a second recess 142 to receive the second protruding ear 202, a second protruding shaft 143 located in the second recess 142 and inserted into the second shaft hole 203 of the second protruding ear 202.

The first side wall 11 of the shell 1 further includes a catch member 16 mounted in the first recess 140 of the connecting seat 14. The catch member 16 has a locking portion 160 locked onto the first side wall 11 of the shell 1. Thus, when the support bracket 2 is rotatable to the open position as shown in FIG. 2, the catch member 16 catches the support bracket 2 to prevent the support bracket 2 from being rotatable toward the closed position as shown in FIG. 1.

Figure 5:
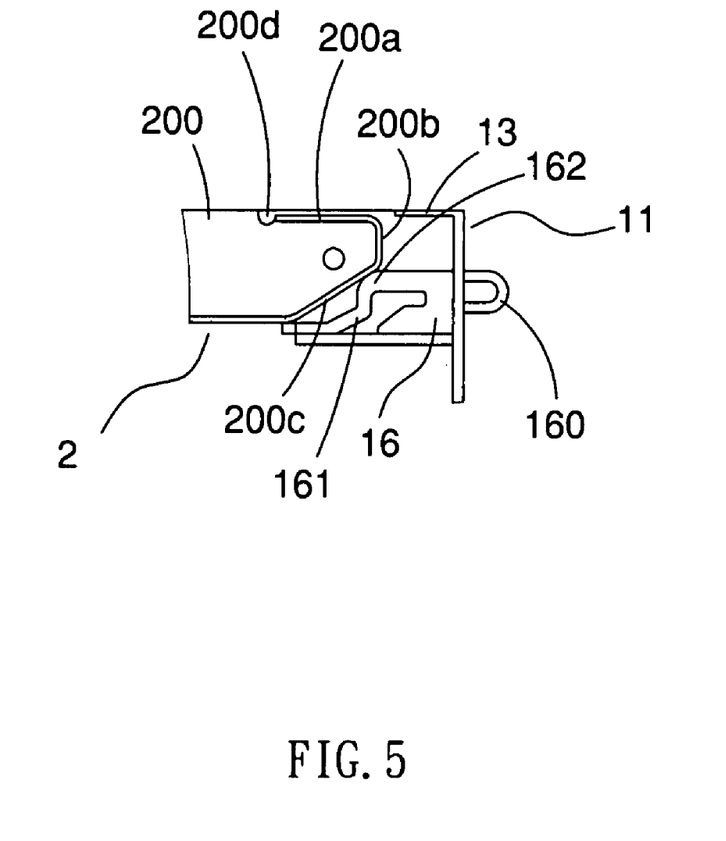
FIG. 5 is a partially plan view of the computer housing as shown in FIG. 1.
Figure 6:
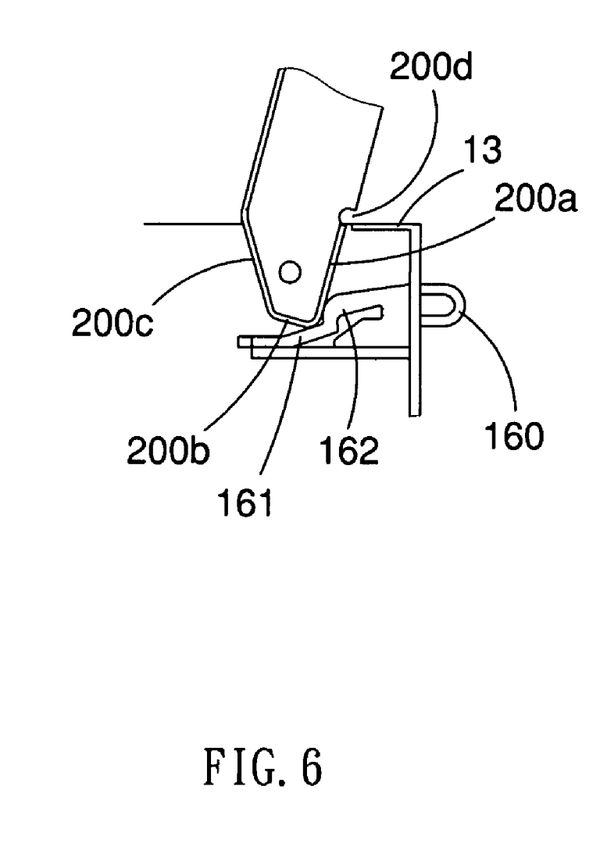
FIG. 6 is a schematic operational view of the computer housing as shown in FIG. 5.

Referring to FIGS. 5 and 6, the first protruding ear 200 has a longer side 200a, a shorter side 200b connected and perpendicular to the longer side 200a, and an oblique side 200c connected to the shorter side 200b and located opposite to the longer side 200a. When the support bracket 2 is rotatable to the closed position as shown in FIG. 1, the longer side 200a of the first protruding ear 200 is directed toward the outside of the shell 1. The catch member 16 has an elastic plate 161 having a protrusive section, such as an arch-shaped section 162, and a sunken section extending from the protrusion section for catching the first protruding ear 200. When the support bracket 2 rotates to the open position as shown in FIG. 2, the elastic plate 161 of the catch member 16 is pressed and deformed, and the longer side 200a of the first protruding ear 200 is rested on the arch-shaped section 162 of the catch member 16 as shown in FIG. 6. That is, the first protruding ear 200 biases the elastic plate and is lodged in the sunken section of the elastic plate. When the support bracket 2 rotates to the closed position as shown in FIG. 1, the elastic plate 161 of the catch member 16 is restored to the original state, and the oblique side 200c of the first protruding ear 200 is rested on the arch-shaped section 162 of the catch member 16 as shown in FIG. 5.

The longer side 200a of the first protruding ear 200 has a breach 200d. When the support bracket 2 is rotatable to the open position as shown in FIG. 2, the breach 200d faces the first piece 13 of the shell 1 as shown in FIG. 6 to prevent the first protruding ear 200 from pressing the first piece 13 of the shell 1 during rotation.

Thus, when the support bracket 2 is rotatable to the open position as shown in FIG. 2, the support bracket 2 is positioned by the catch member 16 as shown in FIG. 6 to prevent the support bracket 2 from being moved freely so that the user needs to apply a larger force to restore the elastic plate 161 of the catch member 16 to the original state. Thus, the support bracket 2 is positioned by the catch member 16 so that the support bracket 2 will not fall down due to hit to prevent the user from being hurt and to prevent the peripheral device 3 from being damaged.

Referring to FIGS. 1-4, the second recess 142 of the connecting seat 14 is smaller than the first recess 140, so that the first recess 140 of the connecting seat 14 has a size to allow axial detachment of the first shaft hole 201 of the support bracket 2 from the first protruding shaft 141 of the connecting seat 14, and the second recess 142 of the connecting seat 14 has a size to limit axial detachment of the second shaft hole 203 of the support bracket 2 from the second protruding shaft 143 of the connecting seat 14.

Figure 7:
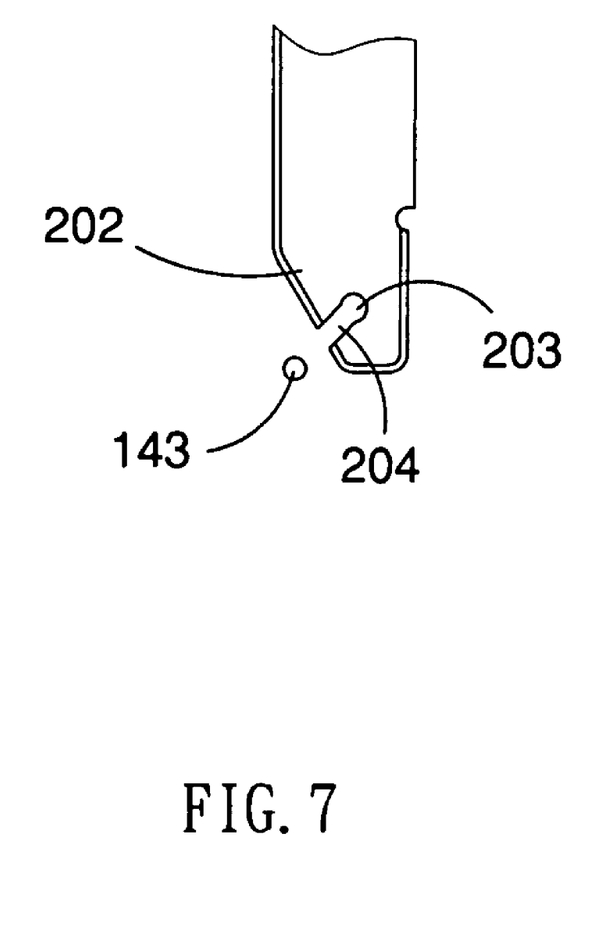
FIG. 7 is a partially plan exploded view of the second protruding ear and the second protruding shaft of the computer housing as shown in FIG. 4.
Figure 8:
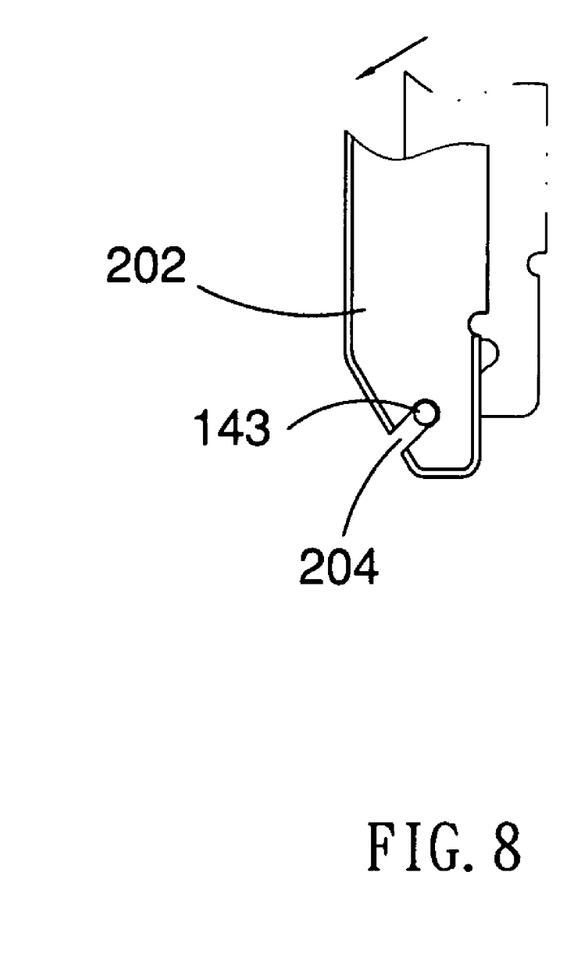
FIG. 8 is a plan assembly view of the second protruding ear and the second protruding shaft of the computer housing as shown in FIG. 7.
Figure 9:
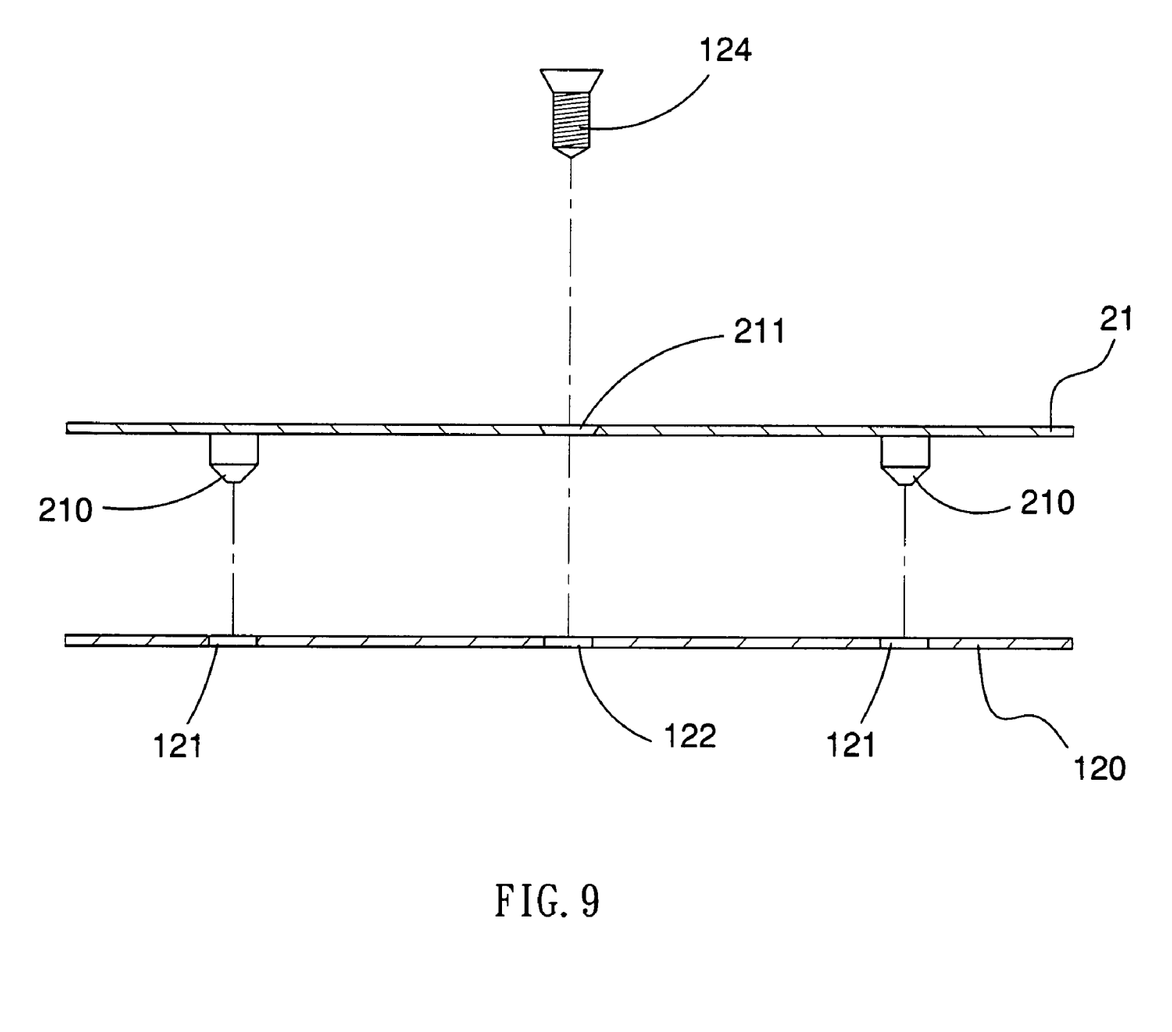
FIG. 9 is a partially plan cross-sectional exploded view of the tail portion of the support bracket and the second side wall of the shell as shown in FIG. 2.

Referring to FIGS. 7 and 8, the second protruding ear 202 of the support bracket 2 has a breach 204 extending from an edge of the second protruding ear 202 to the second shaft hole 203. Thus, when the support bracket 2 is mounted onto the connecting seat 14, the first protruding ear 200 is inserted into the first recess 140, and the first shaft hole 201 of the first protruding ear 200 is mounted on the first protruding shaft 141 of the connecting seat 14. Then, the second shaft hole 203 of the support bracket 2 is mounted on the second protruding shaft 143 of the connecting seat 14 via the breach 204 the second protruding ear 202, so that the support bracket 2 is rotatably mounted on the connecting seat 14. On the contrary, the second shaft hole 203 of the support bracket 2 is detached from the second protruding shaft 143 of the connecting seat 14 via the breach 204 the second protruding ear 202, and the first shaft hole 201 of the first protruding ear 200 is axially detached from the first protruding shaft 141 of the connecting seat 14 so that the support bracket 2 is detached from the connecting seat 14.

Thus, the support bracket 2 is mounted onto and detached from the connecting seat 14 easily, quickly and conveniently without needing aid of additional tools, thereby facilitating the user assembling and disassembling the support bracket 2.

Referring to FIGS. 1-4, the support portion 22 of the support bracket 2 includes two parallel fixing plates 220 each having a plurality of fixing holes 221. Thus, the peripheral device 3 is locked onto the support portion 22 of the support bracket 2 by the fixing plates 220, the fixing holes 221 and a plurality of screws. Thus, the peripheral device 3 is suspended in and detached from the inside of the shell 1 by the support bracket 2 to save the inner space of the shell 1.

Referring to FIGS. 1-4 and 9, the second side wall 12 of the shell 1 includes a second piece 120 having at least one bolt hole 121 and a screw bore 122. The tail portion 21 of the support bracket 2 has at least one locking bolt 210 locked into the bolt hole 121 and has a through hole 211. Thus, when the support bracket 2 is rotatable to the closed position as shown in FIG. 1, the through hole 211 aligns with the screw bore 122, and the locking bolt 210 is locked into the bolt hole 121, while a screw 124 is extended through the through hole 211 and screwed into the screw bore 122 to fix the tail portion 21 of the support bracket 2 to the second side wall 12 of the shell 1.

Accordingly, the peripheral device 3 is suspended in or detached from the inside of the shell 1 by the support bracket 2 to save the inner space of the shell 1, so that the inner space of the shell 1 is employed efficiently to mount more peripheral devices. In addition, when the support bracket 2 is rotatable to the open position, the support bracket 2 is entirely detached from the side opening 10 of the shell 1, and the peripheral device 3 is entirely detached from the inside of the shell 1, so that the inner space of the shell 1 is entirely exposed outwardly, thereby facilitating assembly, disassembly and maintenance of the parts contained in the inner space of the shell 1. Further, the support bracket 2 is mounted onto and detached from the connecting seat 14 easily, quickly and conveniently without needing aid of additional tools, thereby facilitating the user assembling and disassembling the support bracket 2. Further, the support bracket 2 is positioned by the catch member 16 so that the support bracket 2 will not fall down due to hit to prevent the user from being hurt and to prevent the peripheral device 3 from being damaged.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A computer housing, comprising:
   a shell having a side opening, a first side wall and a second side wall; the first and second side walls being located at two opposite sides of the side opening; wherein the first side wall includes a first piece, a connecting seat detachably mounted on the first piece, and an elastic plate secured at one end to the connecting seat and formed at the other end with a protrusive section and a sunken section extending from the protrusive section;
   a support bracket rotatably mounted on the shell and having a head portion formed with a first protruding ear to be rotatably mounted on the connecting seat of the shell, and a tail portion extending to the second side wall of the shell; the first protruding ear having a longer side, a shorter side connected and perpendicular to the longer side, and an oblique side connected to the shorter side and located opposite to the longer side; the support bracket being rotatable to a closed position where the tail portion of the support bracket is rested on the second side wall of the shell and the first protruding ear of the head portion is rested on the protrusive section of the elastic plate of the first wall, and an open position where the tail portion of the support bracket is detached from the second side wall of the shell, and the elastic plate is biased by the first protruding ear and the first protruding ear is lodged in the sunken section of the elastic plate, wherein when the support bracket is in the closed position, the longer side of the first protruding ear is directed toward the outside of the shell; when the support bracket is in the open position, the elastic plate is pressed and deformed by the first protruding ear, and the longer side of the first protruding ear is rested on the protrusive section of the elastic plate; and when the support bracket rotates to the closed position, the elastic plate is restored to its original state, and the oblique side of the first protruding ear is rested on the protrusive section of the elastic plate.

2. The computer housing in accordance with claim 1, wherein:
   the head portion of the support bracket includes the first protruding ear having a first shaft hole and a second protruding ear spaced from the first protruding ear and having a second shaft hole co-axial with the first shaft hole;
   the connecting seat of the shell has a first recess to receive the first protruding ear, a first protruding shaft located in the first recess and inserted into the first shaft hole of the first protruding ear, a second recess to receive the second protruding ear, a second protruding shaft located in the second recess and inserted into the second shaft hole of the second protruding ear.

3. The computer housing in accordance with claim 1, wherein the longer side of the first protruding ear has a breach, so that when the support bracket rotates to the open position, the breach faces the first piece of the shell.

4. The computer housing in accordance with claim 2, wherein:
   the first recess of the connecting seat has a size to allow axial detachment of the first shaft hole of the support bracket from the first protruding shaft of the connecting seat;
   the second recess of the connecting seat has a size to limit axial detachment of the second shaft hole of the support bracket from the second protruding shaft of the connecting seat;
   the second protruding ear of the support bracket has a breach extending from an edge of the second protruding ear to the second shaft hole.

5. The computer housing in accordance with claim 1, wherein the support bracket further includes a support portion located between the head portion and the tail portion for mounting a peripheral device; and the support portion includes two parallel fixing plates each having a plurality of fixing holes.

6. The computer housing in accordance with claim 1, wherein the second side wall of the shell includes a second piece having at least one bolt hole, and the tail portion of the support bracket has at least one locking bolt locked into the bolt hole when the support bracket rotates to the closed position.

7. The computer housing in accordance with claim 6, wherein the second piece of the second side wall of the shell has a screw bore, and the tail portion of the support bracket has a through hole aligning with the screw bore when the support bracket rotates to the closed position.

* * * * *